US011866108B2

(12) United States Patent
Kelley

(10) Patent No.: US 11,866,108 B2
(45) Date of Patent: Jan. 9, 2024

(54) POSITIONING TOOL FOR USE WITH FRONT-END MODULES OF VEHICLES

(71) Applicant: Nissan North America, Inc., Franklin, TN (US)

(72) Inventor: Daniel Kelley, McMinnville, TN (US)

(73) Assignee: Nissan North America, Inc., Franklin, TN (US)

( * ) Notice: Subject to any disclaimer, the term of this patent is extended or adjusted under 35 U.S.C. 154(b) by 817 days.

(21) Appl. No.: 16/795,047

(22) Filed: Feb. 19, 2020

(65) Prior Publication Data
US 2021/0253190 A1 Aug. 19, 2021

(51) Int. Cl.
*B62D 65/02* (2006.01)
*B62D 65/04* (2006.01)
*B62D 25/12* (2006.01)
*B62D 25/08* (2006.01)
*B25B 27/00* (2006.01)
*B25B 11/02* (2006.01)

(52) U.S. Cl.
CPC ........ *B62D 65/026* (2013.01); *B25B 27/0035* (2013.01); *B62D 65/04* (2013.01); *B25B 11/02* (2013.01); *B62D 25/085* (2013.01); *B62D 25/12* (2013.01)

(58) Field of Classification Search
CPC ..... B25B 11/02; B62D 25/085; B62D 65/026; B62D 65/04; Y10T 29/53913
See application file for complete search history.

(56) References Cited

U.S. PATENT DOCUMENTS

| 4,186,476 A | * | 2/1980 | Mair | B62D 25/105 |
| | | | | 180/69.21 |
| 5,282,305 A | * | 2/1994 | Nutt | E05B 17/06 |
| | | | | 29/464 |
| 6,092,271 A | * | 7/2000 | Stojkovic | E05B 17/06 |
| | | | | 269/904 |

FOREIGN PATENT DOCUMENTS

| CN | 101161401 B | 2/2012 |
| CN | 103661623 A | 3/2014 |
| KR | 20060003529 A | 1/2006 |

* cited by examiner

*Primary Examiner* — Tyrone V Hall, Jr.
(74) *Attorney, Agent, or Firm* — Young Basile Hanlon & MacFarlane, P.C.

(57) ABSTRACT

A positioning tool is disclosed that is configured for use with a front-end module (FEM) of a vehicle to align the FEM with a hood of the vehicle. The positioning tool includes: a body; a receiving member that is connected to the body and configured for engagement with the hood of the vehicle; and at least one engagement member that is supported by the body. The at least one engagement member is configured to interface with the FEM such that movement of the positioning tool causes corresponding movement of the FEM, whereby the FEM is aligned relative to the hood of the vehicle upon closure of the hood of the vehicle.

20 Claims, 7 Drawing Sheets

POSITIONING TOOL FOR USE WITH FRONT-END MODULES OF VEHICLES

TECHNICAL FIELD

The present disclosure generally relates to the assembly of vehicles and, more specifically, to the alignment (e.g., centering) of a vehicle's front-end module (FEM) relative to the hood and the body.

BACKGROUND

Many modern vehicles include a FEM that incorporates or otherwise supports one or more components, such as, for example, the vehicle's radiator, condenser, and supporting hoses; the radiator fan; the hood lock; the headlamps; the front fascia; the air guides; etc. Typically, the FEM is assembled off-line and is then secured to the vehicle. Proper positioning of the FEM (e.g., centering of the FEM relative to the vehicle body) not only facilitates assembly and connection of the vehicle's components, but improves the fit and finish of the vehicle. To this end, assist devices have been developed that support the FEM during alignment and connection to the vehicle. Known assist devices, however, typically locate the FEM relative to one or more (lateral) points on the vehicle body which complicates alignment and connection of FEMs across vehicle platforms since body configurations vary from model to model.

To address this issue, the present disclosure describes a positioning tool that is usable with known assist devices and offers increased versatility. The positioning tool facilitates alignment of the FEM by providing an interface between the FEM and the vehicle's hood striker, which is a staple component that varies little (if at all) from vehicle to vehicle.

SUMMARY

In one aspect of the present disclosure, a positioning tool is disclosed that is configured for use with a front-end module (FEM) of a vehicle to align the FEM with a hood of the vehicle. The positioning tool includes: a body defining a receptacle; an insert that is positioned within the receptacle; at least one arm that extends vertically from the body; at least one locating pin that extends vertically from the body; and at least one standoff that is supported by the at least one arm such that the at least one standoff extends rearwardly from the at least one arm in generally orthogonal relation to the at least one locating pin. The insert defines a channel that is configured to receive a hood striker extending from the hood of the vehicle such that the positioning tool is engageable with the hood of the vehicle upon closure of the hood of the vehicle. The at least one locating pin and the at least one standoff are configured for insertion into corresponding openings in the FEM such that movement of the positioning tool causes corresponding movement of the FEM, whereby the FEM is aligned relative to the hood of the vehicle upon reception of the hood striker by the insert.

In certain embodiments, the at least one locating pin may include a first locating pin and a second locating pin that is spaced laterally from the first locating pin along a length of the positioning tool.

In certain embodiments, the at least one arm may include a first arm and a second arm.

In certain embodiments, the at least one standoff may include a first standoff that is supported by the first arm and a second standoff that is supported by the second arm.

In certain embodiments, the positioning tool may further include a flange that extends vertically from the body along a length of the positioning tool.

In certain embodiments, the flange may be configured for contact with the FEM to resist relative rotation between the FEM and the positioning tool.

In certain embodiments, the body may include a first material of construction and the insert may include a second material of construction that is different from the first material of construction.

In another aspect of the present disclosure, a positioning tool is disclosed that is configured for use with a front-end module (FEM) of a vehicle to align the FEM with a hood of the vehicle. The positioning tool includes: a body; a receiving member that is connected to the body and configured for engagement with the hood of the vehicle; and at least one engagement member that is supported by the body. The at least one engagement member is configured to interface with the FEM such that movement of the positioning tool causes corresponding movement of the FEM, whereby the FEM is aligned relative to the hood of the vehicle upon closure of the hood of the vehicle.

In certain embodiments, the receiving member may define a channel that is configured to receive a hood striker extending from the hood of the vehicle.

In certain embodiments, the receiving member may be integrally formed with the body of the positioning tool.

In certain embodiments, the body of the positioning tool may define a receptacle that is configured to house the receiving member.

In certain embodiments, the body may include a first material of construction and the receiving member may include a second material of construction that is different from the first material of construction.

In certain embodiments, the body of the positioning tool may include a non-metallic material and the receiving member may include a metallic material.

In certain embodiments, the receiving member may be removably connected to the body of the positioning tool.

In certain embodiments, the at least one engagement member may include at least one locating pin that is configured for insertion into at least one corresponding first opening in the FEM.

In certain embodiments, the at least one locating pin may include a first locating pin that is positioned adjacent to a first lateral end of the positioning tool and a second locating pin that is positioned adjacent to a second lateral end of the positioning tool.

In certain embodiments, the at least one engagement member may include at least one standoff that is configured for reception by at least one corresponding second opening in the FEM.

In certain embodiments, the positioning tool may further include at least one arm that extends from the body.

In certain embodiments, the least one arm may support the at least one standoff such that the at least one standoff extends rearwardly from the at least one arm in generally orthogonal relation to the at least one locating pin.

In certain embodiments, the at least one standoff may include a first standoff and a second standoff that is spaced laterally from the first standoff.

In certain embodiments, the at least one arm may include a first arm that supports the first standoff and a second arm that supports the second standoff.

In another aspect of the present disclosure, a method is disclosed for aligning a front-end module (FEM) of a vehicle relative to a hood of the vehicle. The method includes: supporting the FEM on a body of the vehicle; connecting a positioning tool to the FEM such that movement of the positioning tool causes corresponding movement of the FEM; and closing the hood of the vehicle such that the hood of the vehicle engages the positioning tool, whereby the positioning tool and the FEM are laterally repositioned to align the FEM relative to the hood of the vehicle.

In certain embodiments, the method may further comprise movably securing the FEM to the body of the vehicle prior to connecting the positioning tool to the FEM.

In certain embodiments, closing the hood of the vehicle may include inserting a hood striker extending from the hood of the vehicle into a channel defined by a receiving member of the positioning tool.

BRIEF DESCRIPTION OF THE DRAWINGS

According to common practice, the various features of the drawings may not be to scale, and may be arbitrarily expanded or reduced for clarity.

DETAILED DESCRIPTION

The present disclosure describes various embodiments and implementations of a positioning tool that is configured for use with a vehicle's FEM during connection of the FEM to the vehicle. The positioning tool aligns (e.g., centers) the FEM relative to the vehicle's hood, which not only facilitates connection of the various components of the FEM, but improves the fit and finish of the vehicle. While vehicle hood configurations vary, the hood striker, which engages the FEM via the hood lock to secure the hood when closed, is a staple component that deviates little. Configuring the positioning tool for engagement with the hood striker increases the versatility of the positioning tool by allowing for use regardless of the configuration of the vehicle's body or the vehicle's hood. To increase versatility even further, various embodiments of the positioning tool are described herein that allow for use with hood strikers and FEMs of various configurations, sizes, models, etc.

The positioning tool descried herein includes a receiving member (e.g., an insert) that is configured for engagement with (e.g., reception of) the hood striker as well as one or more engagement members that are configured to interface with the FEM such that movement of the positioning tool causes corresponding movement of the FEM. Upon engagement of the positioning tool with the hood striker (e.g., during closure of the hood), the positioning tool is subjected to lateral adjustment (e.g., side-to-side movement), which results in corresponding movement of the FEM and proper alignment of the FEM relative to the vehicle's hood.

Figure 1:
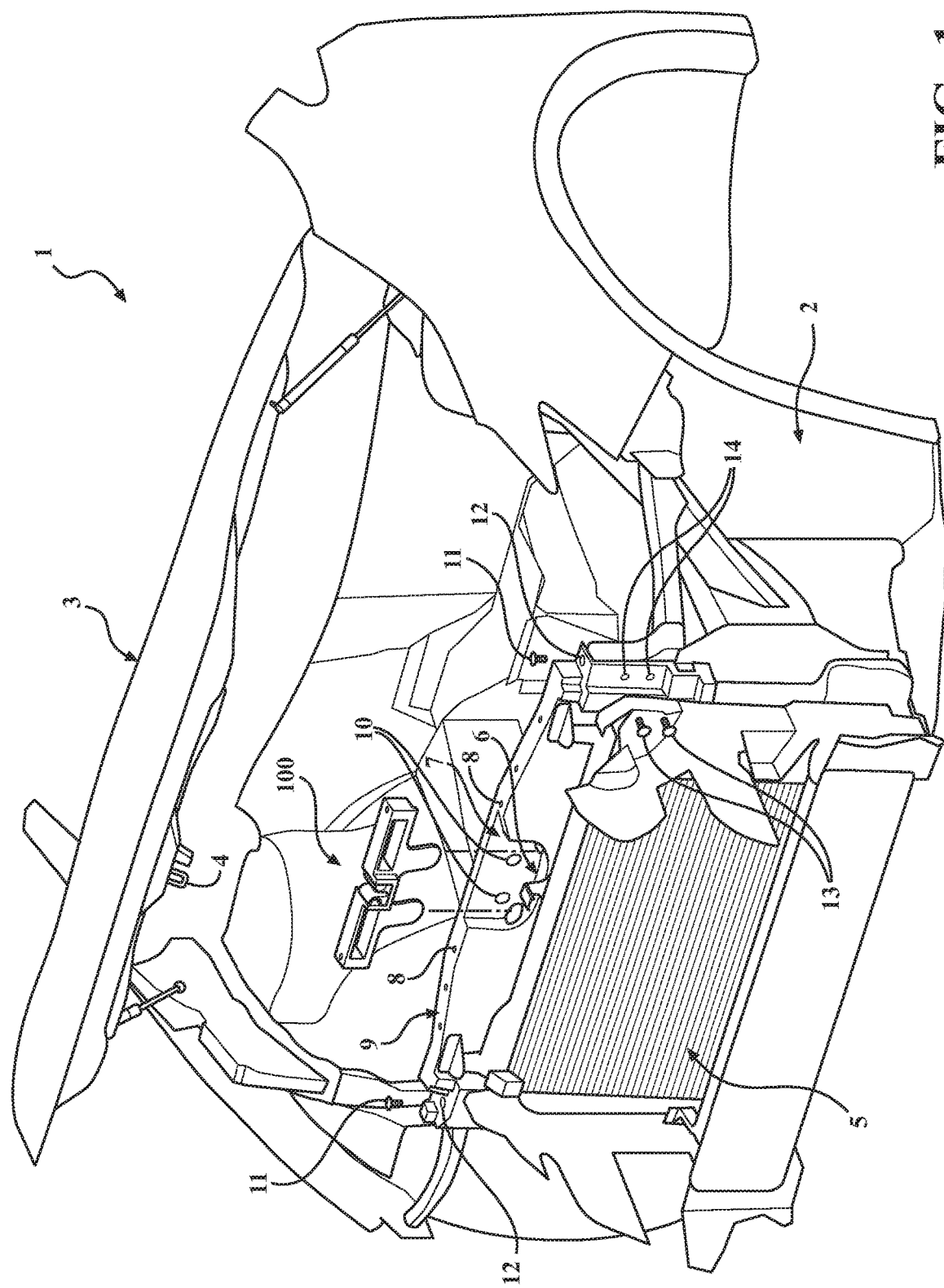
FIG. 1 is a front, perspective view of a vehicle including a FEM shown with one embodiment of a positioning tool configured for use with the FEM to align (e.g., center) the FEM relative to a hood of the vehicle in accordance with the principles of the present disclosure.

With reference to FIG. 1, a vehicle 1 is illustrated together with a positioning tool 100, which is the subject of the present disclosure. The vehicle 1 includes a body 2; a hood 3 with a hood striker 4; and a front-end module (FEM) 5, which itself includes (or otherwise supports) a series of components, such as, for example, the radiator, the condenser, and the supporting hoses; the radiator fan; the hood lock 6, which is configured for engagement with the hood striker 4 to secure the hood 3 in a closed position; the headlamps; the front fascia; the air guides; etc. It should be appreciated that the FEM 5 illustrated in FIG. 1 is merely exemplary and that the particular configuration and components of the FEM 5 may be varied without departing from the scope of the present disclosure (e.g., based upon the particular model, style, etc., of the vehicle 1).

With reference to FIGS. 2A-3B as well, the positioning tool 100 will be discussed. The positioning tool 100 is configured for engagement (contact) with the FEM 5 to facilitate registration of the FEM 5 and the hood 3. Although described herein as being configured and utilized to align (e.g., center) the FEM 5 relative to the hood 3, it should be appreciated that the positioning tool 100 may be configured and utilized to positioning the FEM 5 in any necessary or desired manner, including off-center positioning of the FEM 5.

The positioning tool 100 includes a body 102; a receiving member 104; and one or more engagement members 106 that are configured for engagement (contact) with the FEM 5 (FIG. 1) to connect the positioning tool 100 to the FEM 5. The positioning tool 100 may include (e.g., may be formed partially or entirely from) any suitable metallic or non-metallic material(s) of construction, such as, for example, aluminum; steel; titanium; plastic materials; polymeric materials; carbon fiber; etc., either individually or in combination. Embodiments of the positioning tool 100 including multiple materials of construction are thus contemplated herein. For example, in one particular embodiment, it is envisioned that the body 102 may include (e.g., may be formed from) a non-metallic material, such as one or more plastics, and that the receiving member 104 may include (e.g., may be formed from) a metallic material, such as steel. It is envisioned that the use of a multi-material construction may not only reduce the overall weight of the positioning tool 100, but the overall costs associated therewith.

The body 102 of the positioning tool 100 includes respective upper and lower portions 108, 110 and defines a front face 112 (directed towards the forward-end of the vehicle 1 when connected to the FEM 5), an (opposite) rear face 114, and opposite (first and second) lateral ends 116i, 116ii. The body 102 defines an overall length L that extends between the lateral ends 116i, 116ii; an overall width W that extends between the respective front and rear faces 112, 114 in orthogonal relation to the length L; and an overall height H that extends in orthogonal relation to each of the length L and the width W.

In certain embodiments, such as those shown throughout the figures, the body 102 further includes a flange 118 (FIG. 2B) that extends (vertically) downward from the lower portion 110 along the length L. The flange 118 is configured for engagement (contact) with a (vertical) outer face 7 (FIG. 1) of the FEM 5 (in the region adjacent to the hood lock 6) to resist (if not entirely prevent) relative rotation between the FEM 5 and the positioning tool 100 during alignment of the FEM 5, as described in further detail below.

In certain embodiments, such as those shown throughout the figures, the body 102 of the positioning tool 100 may include one or more reliefs 120, cutouts, or the like to reduce the overall weight of the positioning tool 100 and/or provide tactile surfaces (e.g., handles) to facilitate manipulation and/or location of the positioning tool 100. Although shown as extending completely through the body 102 (in a direction parallel to the width W) throughout the figures, embodiments are also contemplated herein in which the reliefs 120 extend only partially through the body 102.

The receiving member 104 is configured for engagement (contact) with the hood striker 4 (FIG. 1). More specifically, the receiving member 104 defines a channel 122 (FIG. 2A) that extends vertically (e.g., in parallel relation to the height H of the body 102) and is configured to receive the hood striker 4 such that the positioning tool 100 is releasably engageable with the hood striker 4 upon movement of the hood 3 towards the closed position so as to mimic the structure and function of the hood lock 6 (FIG. 1). While the specific configuration of the hood 3 and the FEM 5 may vary from manufacturer to manufacturer and from vehicle to vehicle, the configuration of the hood striker 4 itself will generally remain consistent across vehicle platforms. As such, configuring the positioning tool 100 for engagement with the hood striker 4 increases the versatility and the usability of the positioning tool 100, as discussed in further detail below.

In the particular embodiment of the disclosure illustrated throughout the figures, the receiving member 104 is configured as an insert 124 that is received within (housed by) a receptacle 126 defined by the body 102 of the positioning tool 100. In such embodiments, the insert 124 is formed and configured as a discrete component of the positioning tool 100 that may be connected to the body 102 in any suitable manner. For example, in the illustrated embodiment, the insert 124 may be removably connected to the body 102 via one or more mechanical fasteners 128 (FIG. 2B) (e.g., screws, bolts, etc.). Although shown as being connected via four mechanical fasteners 128 in the illustrated embodiment, it should be appreciated that the particular number of mechanical fasteners 128 may be varied without departing from the scope of the present disclosure.

Figure 4:
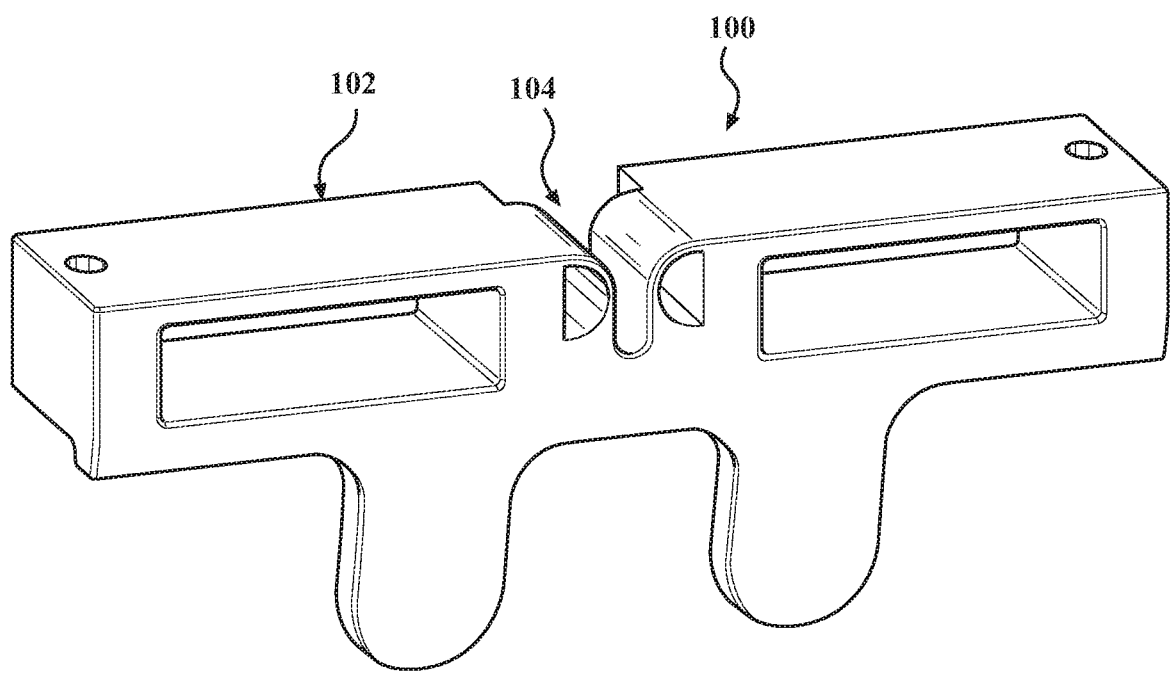
FIG. 4 is a front, perspective view of an alternate embodiment of the positioning tool seen in FIG. 1.

In alternate embodiments of the disclosure, however, it is envisioned that the insert 124 may be fixedly (non-removably) connected to the body 102. For example, it is envisioned that the insert 124 may be adhesively secured to the body 102 or that the receiving member 104 may be integrally formed with the body 102, as seen in FIG. 4. In such embodiments, it is envisioned that the positioning tool 100 (e.g., the body 102 and the receiving member 104) may be formed from a single material of construction, which may be either metallic or non-metallic.

To reduce the overall weight of the positioning tool 100, the receiving member 104 may define a series of reliefs 130 (FIG. 3A), cutouts, or the like. For example, in the embodiment seen in FIGS. 1-3B, the receiving member 104 includes a pair of generally C-shaped cavities 132 (FIGS. 2A, 3A) that are positioned on opposite (lateral) sides of the channel 122 as well as a plurality of (vertical) recesses 134 that are formed in a base portion 136 of the receiving member 104. Although shown as including a pair of cavities 132 and six (generally rectangular) recesses 134 in the illustrated embodiment, it should be appreciated that the particular number of cavities 132 and recesses 134, and the configurations thereof, may be varied without departing from the scope of the present disclosure. Additionally, it should be appreciated that embodiments of the receiving member 104 that are devoid of the reliefs 130 (e.g., the cavities 132 and/or the recesses 134) are also contemplated herein (e.g., to provide added structural reinforcement to the receiving member 104).

Figure 2A:
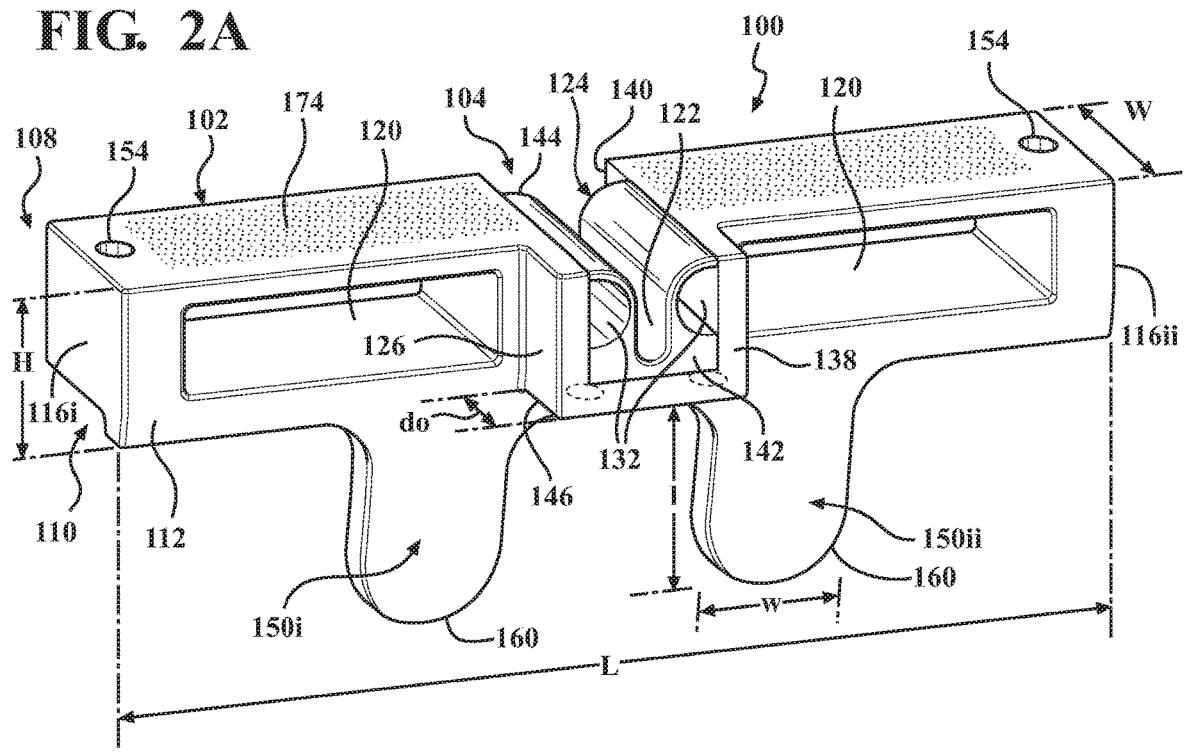
FIG. 2A is a front, perspective view of the positioning tool seen in FIG. 1.
Figure 2B:
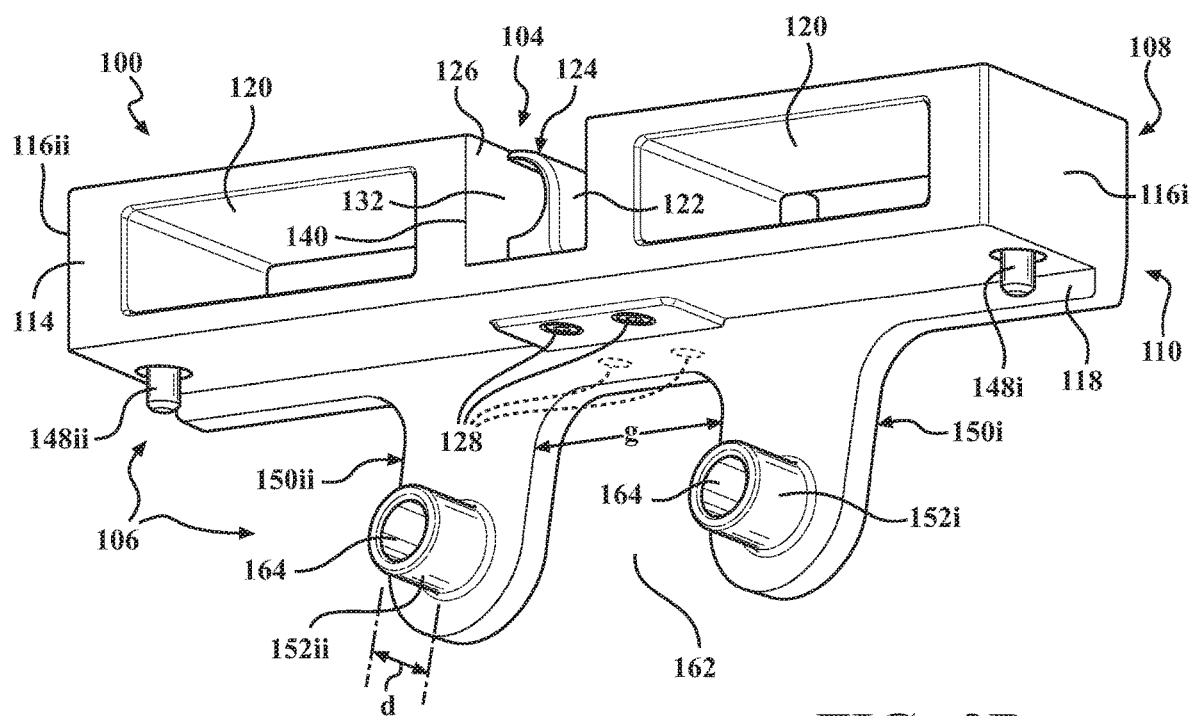
FIG. 2B is a rear, perspective view of the positioning tool seen in FIG. 1.
Figure 3A:
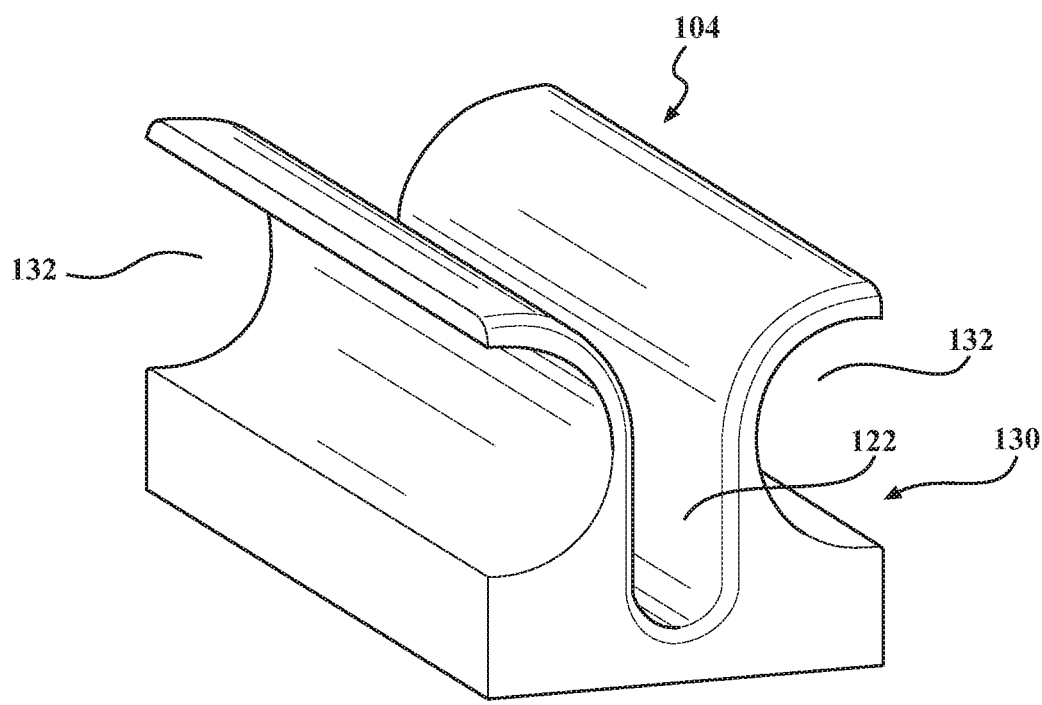
FIG. 3A is a side, perspective view of a receiving member (insert) component of the positioning tool that is configured for engagement with a hood striker extending from the hood of the vehicle.
Figure 3B:
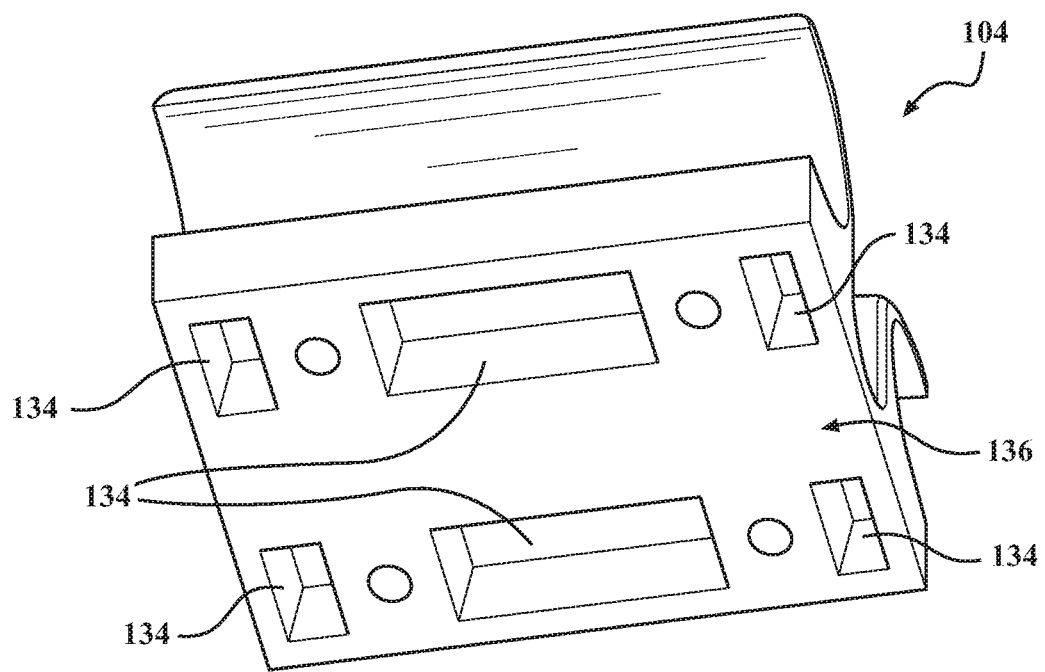
FIG. 3B is a bottom, perspective view of the receiving member seen in FIG. 3A.

As seen in FIGS. 2A and 2B, the receptacle 126 defines respective front and rear ends 138, 140 and the receiving member 104 defines respective front and rear ends 142, 144. In various embodiments of the disclosure, it is envisioned that the ends 142, 144 of the receiving member 104 may be (vertically) aligned with ends 138, 140 of the receptacle 126, respectively, whereby the receiving member 104 is flush-mounted relative to the receptacle 126. Alternatively, however, it is envisioned that the receiving member 104 may be configured such that either or both of the ends 142, 144 thereof are spaced inwardly from (are inset relative to) the corresponding respective ends 138, 140 of the receptacle 126 (along the width W of the body 102) to further reduce the overall weight of the positioning tool 100. For example, in the illustrated embodiment, whereas the end 142 of the receiving member 104 is (vertically) aligned with the end 138 of the receptacle 126, the end 144 of the receiving member 104 is spaced inwardly from the end 140 of the receptacle 126. It is envisioned that varying the specific position of the receiving member 104 relative to the body 102 of the positioning tool 100 (e.g., the receptacle 126) may increase the versatility of the positioning tool 100 by facilitating use of the positioning tool 100 with a variety of vehicles 1 (FIG. 1) in which the precise location of the hood striker 4 may vary. To further increase the versatility of the positioning tool 100, it is envisioned that the position of the receiving member 104 may be further adjusted by altering the specific configuration of the receptacle 126. In the particular embodiment seen in FIGS. 1-3B, for example, the receptacle 126 projects outwardly (forwardly) from the body 102 of the positioning tool 100 such that the front end 138 of the receptacle extends beyond the front face 112 of the body 102 to define an overhang 146 (FIG. 2A) having a dimension do. By varying the overhang 146 (e.g., the dimension do), the specific position of the receiving member 104 can also be varied to increase the compatibility of the positioning tool 100 across vehicle platforms in which the precise location of the hood striker 4 may vary.

With continued reference to FIGS. 1-3B, the engagement member(s) 106 will be discussed. The engagement member(s) 106 are configured for connection to the FEM 5 (FIG. 1) and interface therewith such that such that movement of the positioning tool 100 (e.g., relative to the hood 3, the body 2 of the vehicle 1, etc.) during connection of the FEM 5 to the vehicle 1 causes corresponding movement of the FEM 5. As described in further detail below, via the connection to the FEM 5 established by the engagement member(s) 106, upon movement of the hood 3 towards the closed position and reception of the hood striker 4 by the receiving member 104, the FEM 5 can be aligned with hood 3 in any desired manner (e.g., the FEM 5 can be centered relative to the hood 3).

The engagement members 106 are supported by the body 102 and, in the particular embodiment of the disclosure illustrated throughout the figures, include at least one locating pin 148 and at least one arm 150 supporting at least one standoff 152. More specifically, in the particular embodiment illustrated, the positioning tool 100 includes a (first) locating pin 148i; a (second) locating pin 148ii, a first arm 150i supporting a first standoff 152i; and a second arm 150ii supporting a second standoff 152ii.

Figure 5A:
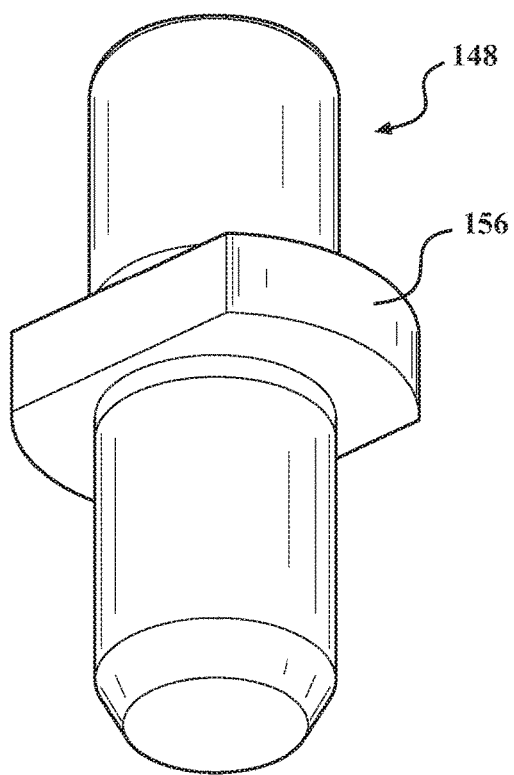
FIG. 5A is a perspective view of a locating pin used to orient the positioning tool relative to the FEM.
Figure 5B:
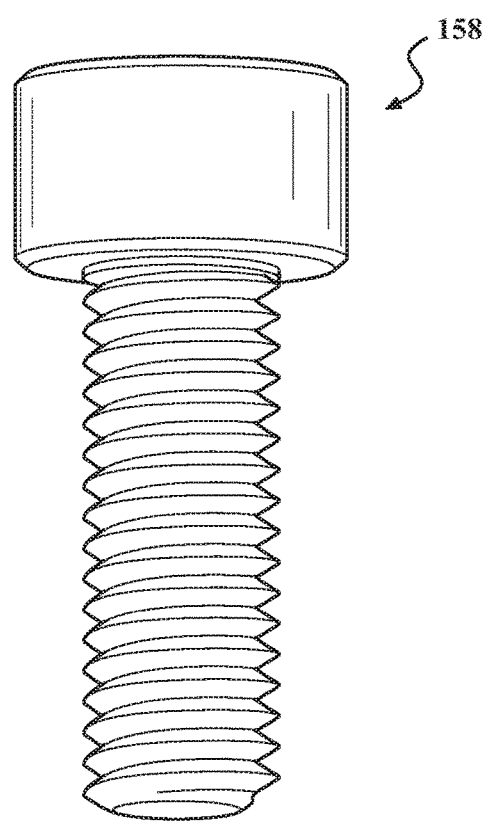
FIG. 5B is a perspective view of a mechanical fastener used to secure the locating pin to the positioning tool.

The locating pins 148i, 148ii are spaced from each other along the length L of the body 102 and, more specifically, are positioned adjacent to the lateral ends 116i, 116ii of the body 102, respectively. The locating pins 148 extend vertically (downward) from the body 102 and are configured for removable insertion into corresponding (first) opening(s) 8 defined in an upper surface 9 (FIG. 1) of the FEM 5 to align the positioning tool 100 relative to the FEM 5 and further resist (if not entirely prevent) relative rotation between the FEM 5 and the positioning tool 100. The locating pin(s) 148 are inserted into and through the body 102 of the positioning tool 100 via (vertical) aperture(s) 154 (FIG. 2A). Each locating pin 148 defines a radial shoulder 156 (FIG. 5A) extending outwardly therefrom that is configured for engagement (contact) with an internal shoulder (not shown) defined within the body 102 and is retained in place via a mechanical fastener 158 (FIG. 5B) (e.g., a screw, a bolt, etc.) that is threadably connected thereto. Although shown as including two locating pins 148 in the illustrated embodiment, it should be appreciated that the particular number (and/or location) of the locating pin(s) 148 may be varied in alternate embodiments of the disclosure to increase the versatility of the positioning tool 100 and facilitate use with FEMs 5 and vehicles 1 that vary in configuration.

The arms 150i, 150ii are spaced laterally from each other along the length L of the body 102. More specifically, the arms 150 extend vertically (downward) from the body 102 and, in the illustrated embodiment, are formed integrally therewith. Although shown as extending in (generally) coplanar relation to the front face 112 of the body 102, in alternate embodiments of the disclosure, it envisioned that the arms 150 may be offset from the front face 112, as described in further detail below.

Each arm 150 defines a length 1 (FIG. 2A) and a width w and includes an (arcuate) end portion 160. The arms 150 support the standoff(s) 152 and are spaced laterally from each other so as to define a generally U-shaped gap 162 (FIG. 2B) therebetween (e.g., to provide clearance for additional components of the vehicle 1 and/or the FEM 5, reduce the overall weight of the positioning tool 100, etc.). The gap 162 spans a (lateral) distance g that may be altered or customized in various embodiments of the disclosure to facilitate use of the positioning tool 100 with a variety of FEMs 5.

The standoff(s) 152 extend horizontally (rearwardly) from the arm(s) 150 in generally orthogonal relation to the locating pin(s) 148 so as to define a depth d (FIG. 2B). The standoff(s) 152 are configured for removable insertion into corresponding (second) opening(s) 10 (FIG. 1) defined in the (vertical) outer face 7 of the FEM 5 to further facilitate alignment of the positioning tool 100 relative to the FEM 5 and further resist (if not entirely prevent) relative rotation between the FEM 5 and the positioning tool 100. Although shown as being generally annular in configuration in the illustrated embodiments, it should be appreciated that the particular configuration of the standoff(s) 152 may be varied in alternate embodiments without departing from the scope of the present disclosure. Additionally, while the standoff(s) 152 are shown as including a hollow 164 in the illustrated embodiment (e.g., to reduce the overall weight of the positioning tool 100), embodiments devoid of the hollow 164 are also contemplated herein (e.g., to provide added structural reinforcement to the standoff(s) 152).

Although shown as including two arms 150 and two standoffs 152 in the illustrated embodiment, it should be appreciated that the particular number (and/or location) of the arms 150 and the standoff(s) 152 may be varied in alternate embodiments of the disclosure to increase the versatility of the positioning tool 100 and facilitate use with FEMs 5 and vehicles 1 that vary in configuration. For example, an embodiment of the positioning tool 100 including a single arm 150 (thereby eliminating the gap 162) supporting one or more standoffs 152 would not be beyond the scope of the present disclosure.

While the positioning tool 100 is illustrated as including both the locating pin(s) 148 and the arm(s) 150 and standoff(s) 152 throughout the figures, embodiments are also contemplated herein in which the locating pin(s) 148 or the arm(s) 150 and the standoff(s) 152 may be eliminated. As such, embodiments including the locating pin(s) 148, but devoid of the arm(s) 150 and the standoff(s) 152, are also envisioned, as are embodiments including the arm(s) 150 and the standoff(s) 152, but devoid of the locating pin(s) 148.

Figure 6:
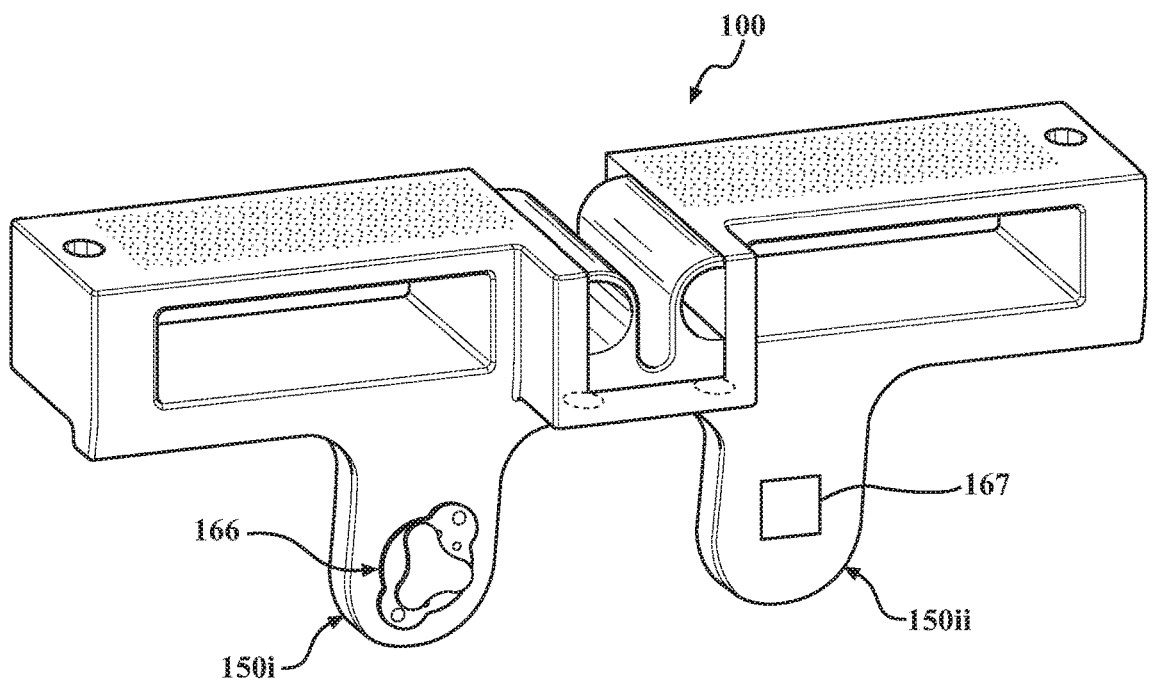
FIG. 6 is a front, perspective view of an alternate embodiment of the positioning tool including a restrictor.

In certain embodiments, in addition to (or instead of) the locating pin(s) 148, the arm(s) 150, and the standoff(s) 152, the positioning tool 100 may further include a restrictor 166 (FIG. 6) that is configured for engagement (contact) with the FEM 5 (FIG. 1) to inhibit (if not entirely prevent) axial movement between the positioning tool 100 and the FEM 5 (e.g., forward and/or rearward movement along the length of the vehicle 1). For example, the restrictor 166 may include a magnetic element that can be activated and deactivated (e.g., via the toggling of a switch) to connect the positioning tool 100 to and disconnect the positioning tool 100 from the FEM 5. Although shown as being located on the arm 150i, it should be appreciated that the particular location of the restrictor 166 may be varied in alternate embodiments without departing from the scope of the present disclosure (e.g., depending upon the particular configuration of the vehicle 1, the FEM 5, spatial restrictions, etc.).

Additionally, or alternatively, it is envisioned that the positioning tool 100 may include a detector 167 (FIG. 6) (e.g., an electrical switch or the like) to provide the user with an indication that the positioning tool 100 has been positively connected to the FEM 5. For example, the detector 167 may be configured to provide a visual and/or audible indication of positive connection upon insertion of the locating pin(s) 148 into the opening(s) 8 (FIG. 1) and/or upon insertion of the standoff(s) 152 into the opening(s) 10. In such embodiments, it is envisioned that the locating pin(s) 148 and/or the standoff(s) 152 may include one or more electrical or magnetic contact(s) to facilitate the completion of a circuit upon connection of the positioning tool 100 to the FEM 5. Although shown as being supported by the arm 150ii in the illustrated embodiment, it should be appreciated that the detector 167 may be positioned in a variety of locations without departing from the scope of the present disclosure. For example, it is envisioned that the detector 167 may instead be positioned on the body 102.

With reference now to FIGS. 1-2B, use of the positioning tool 100 will be discussed in connection with orientation and alignment of the FEM 5.

Initially, the FEM 5 is positioned on the body 2 of the vehicle 1 (using an assist device) so as to generally approximate the desired final position of the FEM 5 (e.g., the FEM 5 is generally centered with respect to the hood 3 of the vehicle 1). Thereafter, one or more mechanical fasteners 11 (e.g. bolts) are (vertically) inserted into the body 2 of the vehicle 1 through one or more corresponding openings 12 in the FEM 5. The mechanical fastener(s) 11 are partially tightened, which allows the FEM 5 to be supported by the body 2 to permit removal of the assist device while providing sufficient clearance to permit lateral (left and right) adjustment in the position of the FEM 5. Either prior or subsequent to insertion of the mechanical fasteners 11, the positioning tool 100 is connected to the FEM 5 via insertion of the locating pin(s) 148 (FIG. 2B) into the opening(s) 8 (FIG. 1) defined in the upper surface 9 of the FEM 5 and via insertion of the standoff(s) 152 into the opening(s) 10 defined in the (vertical) outer face 7 of the FEM 5. When so positioned, flange 118 is positioned in engagement (contact) with the outer face 7 to resist (if not entirely prevent) relative rotation between the FEM 5 and the positioning tool 100, which is also resisted (if not entirely prevented) via the connection established by the locating pin(s) 148 and the standoff(s) 152. Thus, in the illustrated embodiment, the positioning tool 100 defines three points of contact with the FEM 5: the first of which is defined by the interface between the locating pin(s) 148 and the opening(s) 8; the second of which is defined by the interface between the standoff(s) 152 and the opening(s) 10; and the third of which is defined by the interface between the flange 118 and the outer face 7 of the FEM 5.

After connection of the positioning tool 100 to the FEM 5 and removal of the assist device, the hood 3 of the vehicle 1 is moved towards the closed position, whereby the hood striker 4 is inserted into the channel 122 (FIGS. 2A, 2B) defined by the receiving member 104. Insertion of the hood striker 4 into the receiving member 104 causes lateral movement of the positioning tool 100 and, thus, the FEM 5, relative to the body 2 of the vehicle 1 and the hood 3, thereby aligning (e.g., centering) the FEM 5 relative to the hood 3 and the body 2 of the vehicle 1 (e.g., the fenders). As indicated above, proper alignment of the FEM 5 with respect to the body 2 and the hood 3 of the vehicle 1 not only facilitates assembly and connection of the ancillary components of the vehicle 1, but improves the overall fit and finish of the vehicle 1. It envisioned that insertion of the hood striker 4 into the receiving member 104 may maintain the hood 3 in a partially closed position (e.g., due to the higher vertical position of the receiving member 104 relative to the hood lock 6) such that a gap is defined between the hood 3 and the fenders of the vehicle 1 so as to inhibit (if not entirely prevent) pinching of the fender protectors and any damage thereto that might otherwise occur. For example, the positioning tool 100 may be configured such that the gap defined between the hood 3 and the fenders of the vehicle 1 lies substantially within the range of approximately 30 mm to approximately 40 mm.

Following alignment of the FEM 5, the mechanical fasteners 11 are tightened to secure the FEM 5 to the body 2 of the vehicle 1 and the positioning tool 100 is removed. In addition to the fasteners 11, it is envisioned that one or more additional fasteners 13 (FIG. 1) may be (horizontally) inserted into corresponding openings 14 in the FEM 5 to further secure the FEM 5 to the body 2 of the vehicle 1.

To allow for variation in the specific location of the FEM 5 relative to the body 2 and the hood 3 of the vehicle 1 (e.g., from model to model), it is envisioned that the openings 12 and/or the openings 14 may be oversized to facilitate lateral adjustment in the position of the FEM 5 during alignment and connection of the FEM 5 (e.g., to accommodate for manufacturing and assembly tolerances).

As the specific configuration of the FEM 5 may vary from manufacturer to manufacturer and from vehicle to vehicle, the present disclosure contemplates various alterations and modifications to the positioning tool 100 (e.g., to accommodate for the inclusion of different components and/or variations in their positions, manufacturing tolerances, clearance concerns, etc.). For example, with reference to FIGS. 7A, 7B, and 8, it is envisioned that the positioning tool 100 may include a series of (vertical) recesses 168 (e.g., surface irregularities, contours, or the like). More specifically, in the illustrated embodiments, the positioning tool 100 includes a forward recess 168*i* (FIGS. 7A, 7B) that is generally conical (or frusto-conical) in configuration and a pair of rear recesses 168*ii*, 168*iii* that are generally C-shaped in configuration. Additionally, or alternatively, it is envisioned that the positioning tool 100 may include one or more notches 170. For example, the positioning tool may include a notch 170*i* (FIGS. 7A, 7B) located adjacent to either or both of the standoff(s) 152; a notch 170*ii* formed in the flange 118 adjacent to the lateral end 116*ii* of the positioning tool 100; a notch 170*iii* formed in the flange 118 adjacent to the lateral end 116*i* of the positioning tool 100; and one or more notches 170*iv* (FIG. 8) located adjacent to the fastener(s) 128 used to connect the receiving member 104 to the body 102.

Figure 7A:
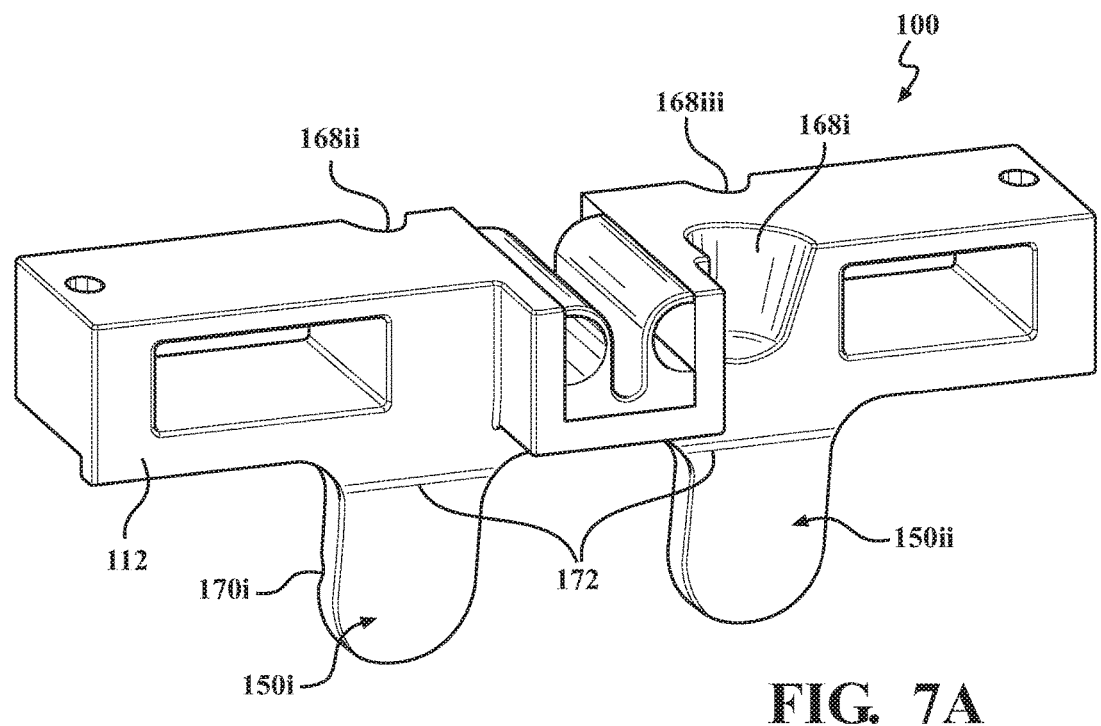
FIG. 7A is a front, perspective view of an alternate embodiment of the positioning tool seen in FIG. 1.
Figure 7B:
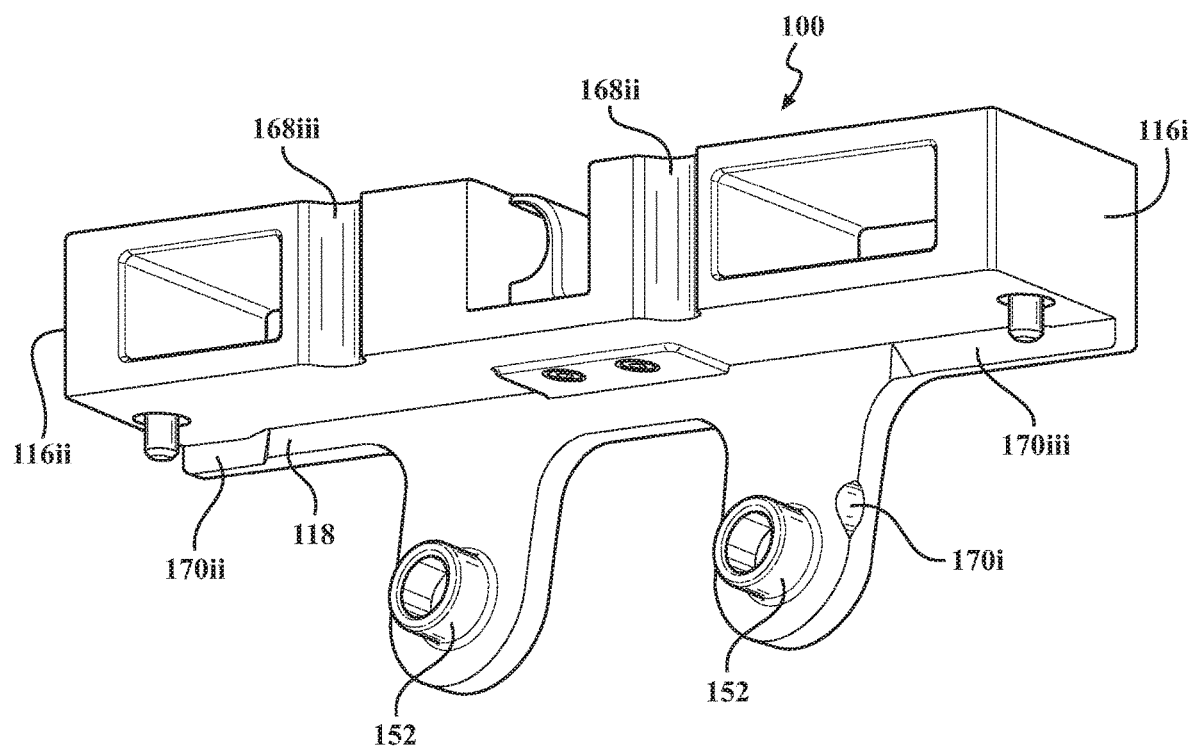
FIG. 7B is a rear, perspective view of the positioning tool seen in FIG. 7A.
Figure 8:
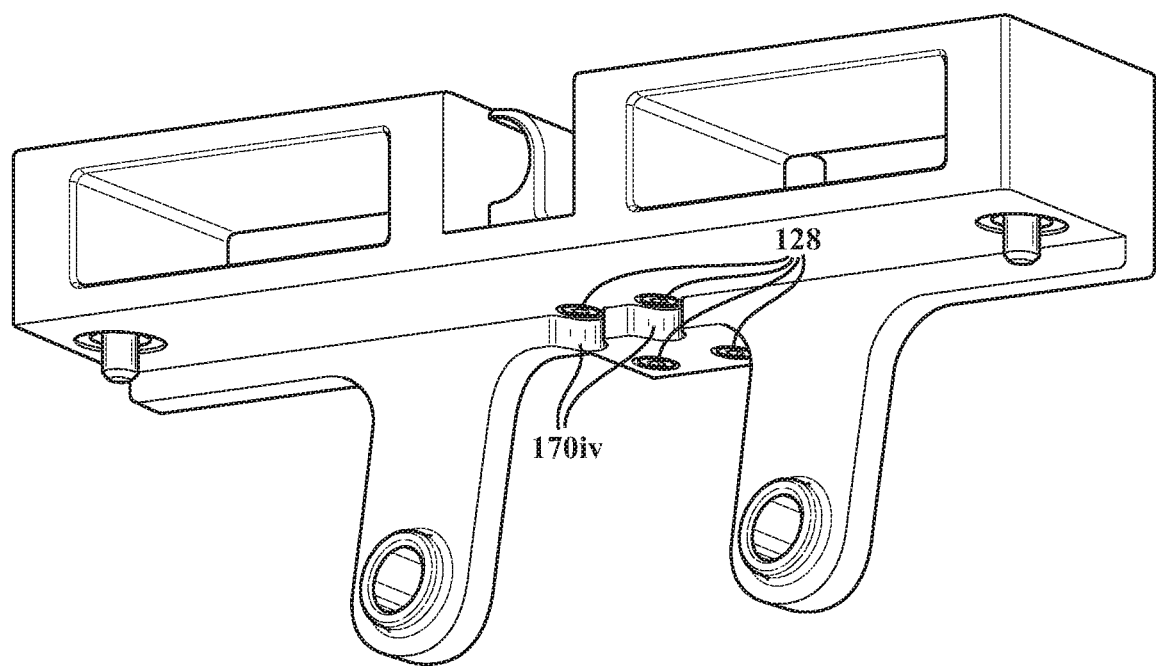
FIG. 8 is a rear, perspective view of an alternate embodiment of the positioning tool seen in FIG. 1.

To further increase the versatility of the positioning tool 100 and usability of the positioning tool 100 with a variety of FEMs 5 and vehicles 1, as indicated above, it is envisioned that the arms 150*i*, 150*ii* may be offset from the front face 112 of the body 102. More specifically, as seen in FIG. 7A, the arms 150*i*, 150*ii* may be connected to the front face 112 via an (arcuate) extension 172 such that the arms 150*i*, 150*ii* are positioned forwardly of the front face 112 (e.g., to create added clearance for one or more components of the vehicle 1 and/or the FEM 5). As mentioned above, it is also envisioned that the dimension do (FIG. 2A) defined by the overhang 146 (e.g., the extent to which the receptacle 126 extends outwardly from the body 102) may be altered to facilitate additional variation in the specific position of the receiving member 104 and increase the compatibility of the positioning tool 100 with vehicles 1 in which the precise location of the hood striker 4 may vary.

With reference again to FIGS. 2A and 2B, to increase the versatility and usability of the positioning tool 100 even further, it is envisioned that one or more dimensions of the positioning tool 100 and/or the components thereof may be varied. For example, the particular configuration and/or sizing of the reliefs 120 may be increased or decreased (relative to the illustrated configuration and/or sizing). Additionally, it is envisioned that the length l of the arms 150, the width w of the arms 150, and/or the spacing of the arms 150 (e.g., the lateral distance g defined by the gap 162) may be increased or decreased as necessary therebetween, and that the depth d of the standoff(s) 152 may be increased or decreased in size (e.g., the standoff(s) 152 may be deepened or shallowed).

To more clearly correlate usage of the positioning tool 100 with a particular FEM 5 and/or vehicle 1, in various embodiments of the disclosure, it is envisioned that the positioning tool 100 may include one or more visual indicators 174 (e.g., the positioning tool 100 may include different coloration, texturing, numbering, or the like to identify its intended usage). For example, the visual indicator(s) 174 may include one coloration (e.g., red) when intended for use with one FEM 5 or vehicle 1 and another coloration (e.g., blue) when intended for use with another FEM 5 or vehicle 1. To further reduce any potential for user error, it is envisioned that the coloration of the visual indicator(s) 174 may be customized in correspondence with one or more features of the FEM 5 or the vehicle 1 (e.g., the coloration of the visual indicator(s) 174 may correspond to that of the aforementioned fender protectors).

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A positioning tool configured for use with a front-end module (FEM) of a vehicle to align the FEM with a hood of the vehicle, the positioning tool comprising:
    a body defining a receptacle;
    an insert positioned within the receptacle, the insert defining a channel configured to receive a hood striker extending from the hood of the vehicle such that the positioning tool is engageable with the hood of the vehicle upon closure of the hood of the vehicle;
    at least one arm extending vertically from the body;
    at least one locating pin extending vertically from the body; and
    at least one standoff supported by the at least one arm such that the at least one standoff extends rearwardly from the at least one arm in generally orthogonal relation to the at least one locating pin, wherein the at least one locating pin and the at least one standoff are configured for insertion into corresponding openings in the FEM such that movement of the positioning tool causes corresponding movement of the FEM, whereby the FEM is aligned relative to the hood of the vehicle upon reception of the hood striker by the insert.

2. The positioning tool of claim 1, wherein the at least one locating pin includes a first locating pin and a second locating pin spaced laterally from the first locating pin along a length of the positioning tool.

3. The positioning tool of claim 2, wherein the at least one arm includes a first arm and a second arm and the at least one standoff includes a first standoff supported by the first arm and a second standoff supported by the second arm.

4. The positioning tool of claim 1, further including a flange extending vertically from the body along a length of the positioning tool, the flange being configured for contact with the FEM to resist relative rotation between the FEM and the positioning tool.

5. The positioning tool of claim 1, wherein the body includes a first material of construction and the insert includes a second material of construction different from the first material of construction.

6. A positioning tool configured for use with a front-end module (FEM) of a vehicle to align the FEM with a hood of the vehicle, the positioning tool comprising:
    a body;
    a receiving member connected to the body, the receiving member being configured for engagement with the hood of the vehicle; and
    at least one engagement member supported by the body, the at least one engagement member being configured to interface with the FEM such that movement of the positioning tool causes corresponding movement of the FEM, whereby the FEM is aligned relative to the hood of the vehicle upon closure of the hood of the vehicle.

7. The positioning tool of claim 6, wherein the receiving member defines a channel configured to receive a hood striker extending from the hood of the vehicle.

8. The positioning tool of claim 7, wherein the receiving member is integrally formed with the body of the positioning tool.

9. The positioning tool of claim 7, wherein the body of the positioning tool defines a receptacle configured to house the receiving member, the body including a first material of construction and the receiving member including a second material of construction different from the first material of construction.

10. The positioning tool of claim 9, wherein the body of the positioning tool includes a non-metallic material and the receiving member includes a metallic material.

11. The positioning tool of claim 10, wherein the receiving member is removably connected to the body of the positioning tool.

12. The positioning tool of claim 7, wherein the at least one engagement member includes at least one locating pin configured for insertion into at least one corresponding first opening in the FEM.

13. The positioning tool of claim 12, wherein the at least one locating pin includes a first locating pin positioned adjacent to a first lateral end of the positioning tool and a second locating pin positioned adjacent to a second lateral end of the positioning tool.

14. The positioning tool of claim 12, wherein the at least one engagement member includes at least one standoff configured for reception by at least one corresponding second opening in the FEM.

15. The positioning tool of claim 14, wherein the positioning tool further includes at least one arm extending from the body, the at least one arm supporting the at least one standoff such that the at least one standoff extends rearwardly from the at least one arm in generally orthogonal relation to the at least one locating pin.

16. The positioning tool of claim 15, wherein the at least one standoff includes a first standoff and a second standoff spaced laterally from the first standoff.

17. The positioning tool of claim 16, wherein the at least one arm includes a first arm supporting the first standoff and a second arm supporting the second standoff.

18. A positioning tool configured for non-permanent connection to a front-end module (FEM) of a vehicle to align the FEM with a hood of the vehicle, the positioning tool comprising:
a body including a flange extending therefrom along a height of the body and laterally along a length of the body, the flange configured for contact with an outer face of the FEM to resist relative rotation between the positioning tool and the FEM; and
a receiving member connected to the body, the receiving member defining a channel configured to receive a hood striker extending from the hood such that the positioning tool is releasably engageable with the hood upon movement of the hood towards a closed position wherein the positioning tool is configured for removal from the FEM following alignment of the FEM with the hood of the vehicle.

19. The positioning tool of claim 18, wherein the body defines a receptacle configured to house the receiving member, the receptacle extending outwardly from the body so as to define an overhang and thereby allow for positional variation of the receiving member to increase compatibility of the positioning tool across vehicle platforms.

20. The positioning tool of claim 18, further comprising one or more of:
a restrictor configured for engagement with the FEM to inhibit relative axial movement between the positioning tool and the FEM along a length of the vehicle; and
a detector configured to provide an indication of positive engagement between the positioning tool and the FEM.

* * * * *